(No Model.)
D. BOYD.
ELECTRIC CALL BELL.
No. 293,938. Patented Feb. 19, 1884.
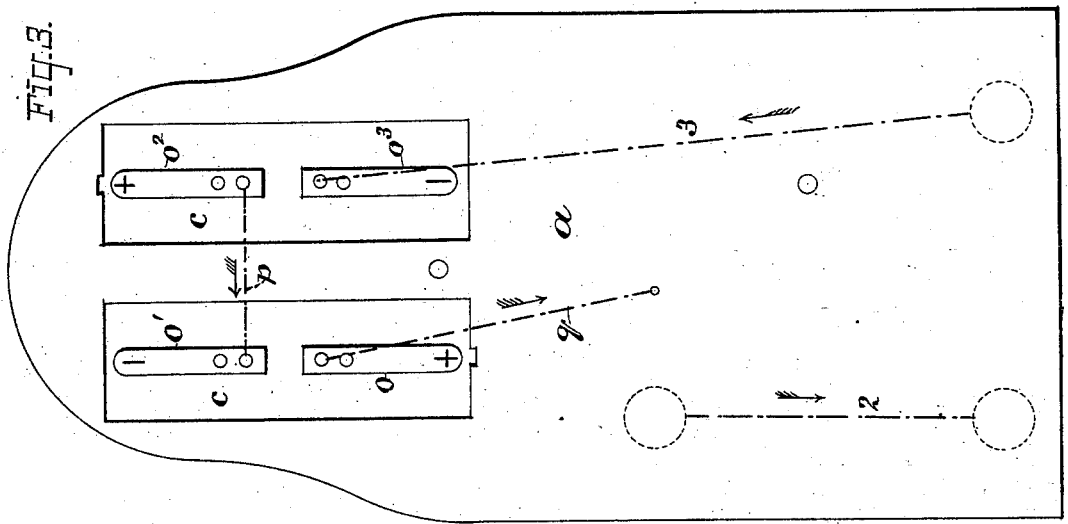
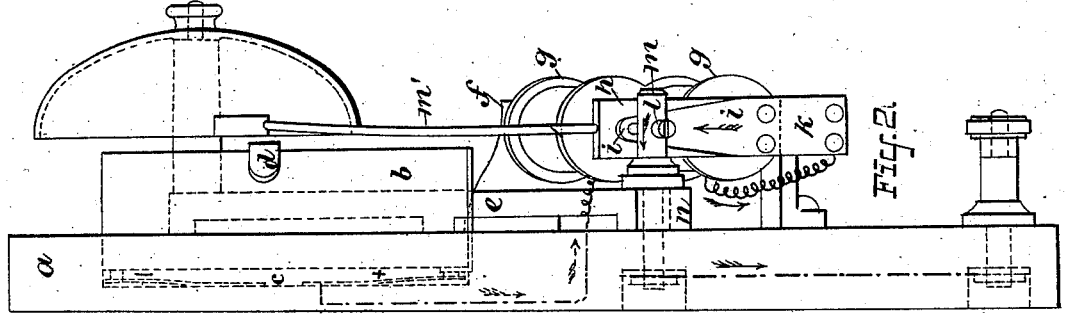
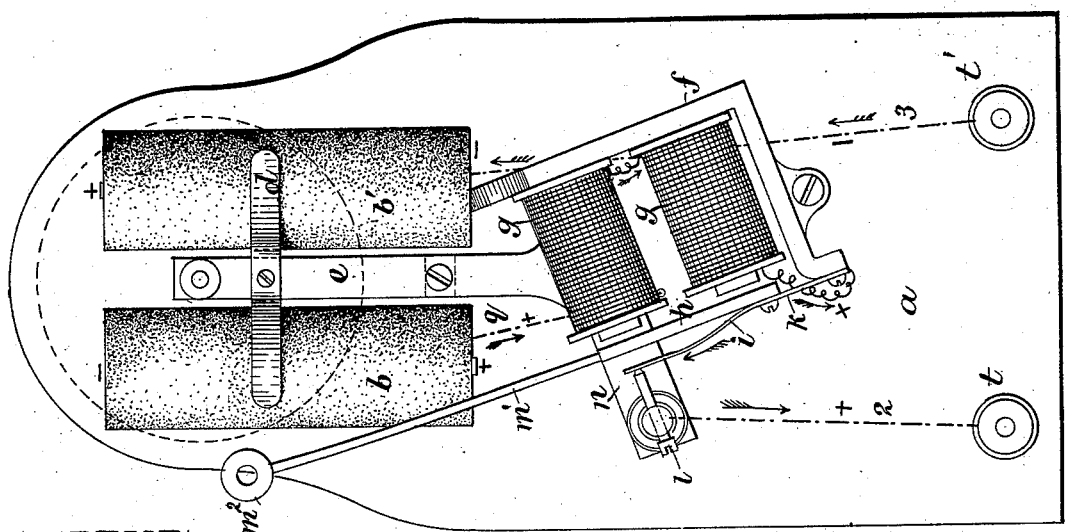
ATTEST:
N. H. Bradshaw
J. A. Hurdle
INVENTOR:
Dan. Boyd
Pr J. A. Hurdle
att'y

UNITED STATES PATENT OFFICE.

DAN BOYD, OF MANCHESTER, ENGLAND, ASSIGNOR TO THE DOMESTIC ELECTRICAL MANUFACTURING COMPANY, OF BOSTON, MASS.

ELECTRIC CALL-BELL.

SPECIFICATION forming part of Letters Patent No. 293,938, dated February 19, 1884.

Application filed June 2, 1883. (No model.)

*To all whom it may concern:*

Be it known that I, DAN BOYD, a subject of the Queen of Great Britain, and a resident of Manchester, England, have invented certain new and useful Improvements in Electric Call-Bells, of which the following is a specification.

The main feature of my invention consists in so constructing an electric call-bell that each bell will be provided with its own battery on the same base with the electro-magnetic bell, thus forming a complete self-contained combined electro-magnetic bell and battery, whereby the erection and connecting up of call-bell circuits will be greatly simplified.

My invention further relates to improvements in the details of construction of the call-bell, as more fully described hereinafter.

In the accompanying drawings, Figure 1 represents a plan or face view of my improved call-bell with the gong removed. Fig. 2 is a side view, and Fig. 3 a plan view, of the base, with the magnets, batteries, gong, and operative parts removed to illustrate the circuits more clearly.

The base $a$, which, as usual, is made of wood or other suitable non-conducting material, has secured to it a frame, $f$, preferably of metal, carrying the coil or coils of the electro-magnet $g$. To this frame $f$ is also secured the end of a metallic spring, $k$, electrically connected with one terminal of the coils, and carrying the armature $h$, with its extension $m'$, and hammer $m^2$ for the gong, which is indicated by dotted lines in Fig. 1.

I prefer to make the contact-spring $i$ for the circuit-breaker in one with and a part of the spring $k$, supporting the armature and hammer, and this spring-finger $i$ is adapted to make contact with the adjustable screw $l$ in the insulated post $m$, connected through the conductor 2 with the binding-post $t$.

Combined with the parts above described, I mount on the base $a$ one or more hermetically-sealed cells, $b$ $b'$, of battery, two being shown in the drawings. As a convenient position for these sealed cells, I have shown them as adapted to recesses $c$ $c$ in the base underneath the gong, and retained in position by a yoke-piece, $d$, which may be in the form of a spring mounted on an extension, $e$, of the frame $f$. Each sealed cell is complete in itself, and has metallic end pieces connected to its electrodes and forming terminals, and to the base are secured corresponding spring contacts, $o$ $o'$ and $o^2$ $o^3$, in the bottom of the recesses $c$, so the connections are made by simply placing the sealed cells in place without the use of binding-posts or screw-couplings. The circuit from the terminal of the coils opposite that connected with the circuit-breaker $i$ is through the conductor $q$, spring-contact $o$, battery $b$, contact $o'$, conductor $p$, contact $o^2$, battery $b'$, contact $o^3$, and conductor 3, to the binding-post $t'$.

The device above described forms a complete self-contained instrument, which is ready at any time to be put up and in operation by simply connecting the terminals of a line-wire (provided only with a push-button or equivalent) to the binding-posts $t$ $t'$, the trouble of connecting up a separate battery, with its necessary binding-posts, screws, or similar connections, being entirely dispensed with and the erection of call-bell lines greatly simplified. When a sealed cell $b$ $b'$ becomes exhausted, it can be readily removed and replaced by a duplicate, and the connections completed by simply laying the substitute cell in position.

I claim as my invention—

1. As a new article of manufacture, the herein-described self-contained electrical call-bell, consisting of a base, an electro-magnetic bell and one or more battery-cells in circuit therewith, and two terminals or posts, all mounted on the said base, and the whole complete for use and operative on the closure of the circuit, substantially as set forth.

2. The combination of a base and an electro-magnetic bell with one or more detachable sealed cells of battery in circuit therewith, and binding-posts or terminals, the bell, cells, and posts or terminals being mounted on the said base, and the whole constituting a self-contained electric call-bell operative on the closure of the circuit, substantially as described.

3. The combination of an electro-magnetic bell and a detachable sealed cell of battery having terminals with a base carrying said bell and battery, and having circuit-connections and spring-contacts, substantially as described, whereby the connections are made on simply placing the said cell in position.

4. The combination of an electro-magnetic bell and base therefor with sealed cells of battery mounted on said base, and a retaining yoke for said cells.

5. The combination of an electro-magnetic bell and sealed cells of battery with a base having recesses $c$, and contact-springs for the cells, substantially as set forth.

6. The combination of a base and a frame, $f$, carrying electro-magnet, armature, hammer, and circuit-breaker, and having an extension, $e$, with sealed cells of battery, and retaining-yoke carried by said extension of the frame.

Signed at New York, in the county of New York and State of New York, this 1st day of June A. D. 1883.

DAN BOYD.

Witnesses:
W. H. WILDE,
WM. H. BLAIN.